United States Patent [19]

Herold et al.

[11] Patent Number: 4,525,234
[45] Date of Patent: Jun. 25, 1985

[54] ADHESIVE, PRE-GELLED PLASTISOLS AND PROCESS OF PREPARATION

[75] Inventors: Julius Herold, Monheim; Ingeborg Geisen, Düsseldorf, both of Fed. Rep. of Germany

[73] Assignee: Henkel Kommanditgesellschaft (KGaA), Duesseldorf, Fed. Rep. of Germany

[21] Appl. No.: 643,090

[22] Filed: Aug. 21, 1984

Related U.S. Application Data

[63] Continuation of Ser. No. 519,828, Aug. 2, 1983, abandoned.

[30] Foreign Application Priority Data

Aug. 9, 1982 [DE] Fed. Rep. of Germany ....... 3229656

[51] Int. Cl.$^3$ .................. C08J 5/00; C08L 27/06; C08L 33/12; C08L 31/04
[52] U.S. Cl. .................... 156/332; 156/333; 524/158; 524/270; 524/287; 524/293; 524/296; 524/560; 524/563; 524/569; 524/297; 524/377
[58] Field of Search .............. 524/569, 563, 560, 297, 524/158, 270, 287, 293, 296, 377; 156/332, 333

[56] References Cited

U.S. PATENT DOCUMENTS 4,319,012 3/1982 Morningstar ........................ 524/313
4,356,283 10/1982 Weinlich et al. ................... 524/504

OTHER PUBLICATIONS

Derwent Abst. 47808 K/20 (J58059249) 4-1983.
Derwent Abst. 12861 E/07 (J57003846) 1-1982.
Derwent Abst. 45703 E/22 (SU854958) 8-1981.
Derwent Abst. 42551 E/21 (J57063369) 4-1982.
Derwent Abst. 29789 E/15 (J57039999) 3-1983.

Primary Examiner—Herbert J. Lilling
Attorney, Agent, or Firm—Ernest G. Szoke; Nelson Littell, Jr.; Henry E. Millson, Jr.

[57] ABSTRACT

This invention is directed to a process for preparing an adhesive, pre-gelled plastisol composition which comprises the steps of
(a) mixing polyvinyl acetate or copolymers of vinyl acetate with one or more comonomers selected from the group consisting of vinyl alcohol $C_3$-$C_{18}$-carboxylic acid esters, ethylene, propylene, butylene, and vinyl chloride with conventional non-gelled plastisol mixtures based upon (i) polyvinyl chloride and/or polymethyl methacrylate and (ii) one or more suitable plasticizers in a ratio of from about 10 to 200 parts by weight of polyvinyl chloride or copolymers of vinyl acetate to 100 parts by weight of polyvinyl chloride and/or polymethyl methacrylate,
(b) heating the mixture from step (a) to a temperature of from about 80° to 130° C.

The resulting composition is useful in joining, sealing, or stiffening automobile body components.

12 Claims, No Drawings

ADHESIVE, PRE-GELLED PLASTISOLS AND PROCESS OF PREPARATION

This application is a continuation of application Ser. No. 519,828, filed Aug. 2, 1983, and now abandoned.

FIELD OF THE INVENTION

This invention relates to adhesive, pre-gelled plastisols. More specifically, this invention relates to the preparation of adhesive, pre-gelled plastisols and their use in joining, sealing, and stiffening automobile body parts.

BACKGROUND OF THE INVENTION

Plastisols are emulsions of organic polymers in plasticizers which gel upon heating to elevated temperatures. The plastisols used are generally based upon homopolymers and copolymers of vinyl chloride and methyl methacrylate. They are widely used as coating compositions for metals and other substrates, as adhesives, and as sealing materials. One disadvantage of using plastisols as sealing materials is the so-called "legging" of the pasty compositions, which frequently results in soiling of the articles to be sealed and necessitates expensive finishing work. This disadvantage may be prevented by using known pre-gelled plastisol tapes or forms, i.e., masses. However, difficulties are involved in their application due to the lose of adhesion, caused by pre-gelation, to the materials to be coated and, in particular, to be bonded to one another.

OBJECTS OF THE INVENTION

It is an object of this invention to provide adhesive, pre-gelled plastisols.

It is also an object of this invention to provide adhesive, pre-gelled plastisols which may be used, without additional fixing, to join, seal, or stiffen automobile body parts.

It is a further object of the invention to provide a process for preparing adhesive, pre-gelled plastisol compositions wherein (a) polyvinyl acetate or co-polymers of vinyl acetate are admixed with conventional, non-gelled plastisol mixtures based upon (i) polyvinyl chloride and/or polymethyl methacrylate and (ii) suitable plasticizers in a ratio of from about 10 to 200 parts by weight of polyvinyl acetate or co-polymers of vinyl acetate to 100 parts by weight of polyvinyl chloride and/or polymethyl methacrylate, and (b) the resulting admixtures are heated to temperatures of from about 80° to 130° C.

These and other objects of the invention will become more apparent in the discussion below.

DETAILED DESCRIPTION OF THE INVENTION

According to the invention, novel, adhesive, pre-gelled plastisols compositions are prepared by a procedure wherein (a) polyvinyl acetate or co-polymers of vinyl acetate with co-monomers selected from the group consisting of vinyl alcohol $C_3$–$C_{18}$-carboxylic acid esters, ethylene, propylene, butylene, and vinyl chloride are admixed with conventional, non-gelled plastisol mixtures based upon polyvinyl chloride and/or polymethyl methacrylate and suitable plasticizers in a quantity of from about 10 to 200 parts by weight of polyvinyl acetate or vinyl acetate co-polymers per 100 parts by weight of polyvinyl chloride and/or polymethyl methacrylate, and (b) the resulting admixture is heated to temperatures of from about 80° to 130° C., preferably from about 90° to 120° C.

The adhesive, pre-gelled compositions, or moldings, produced after heating of the plastisol mixture may advantageously be cut up or tapes, sheets, or other desired shapes or forms may be produced directly by warm extrusion.

The present invention also relates to adhesive moldings, from pre-gelled plastisols based upon polyvinyl chloride and/or polymethyl methacrylate wherein to develop their adhesiveness, polyvinyl acetate or co-polymers of vinyl acetate with co-monomers selected from the group consisting of vinyl alcohol $C_3$–$C_{18}$-carboxylic acid esters, ethylene, propylene, butylene, and vinyl chloride are admixed and then are converted into an adhesive state by heating to temperatures of from about 80° to 130° C., preferably from about 90° to 120° C.

The adhesive moldings prepared according to the invention may especially advantageously be used for sealing bodywork components in the automotive industry.

To obtain an adhesive state, polyvinyl acetate and/or the co-polymers mentioned above are used in a quantity of from about 10 to 200 parts by weight, preferably from about 25 to 125 parts by weight, to 100 parts by weight of polyvinyl chloride and/or polyvinyl methacrylate. This essential component comprises a group of polymers which are not normally used in the production of plastisols or plastigels, i.e., polyvinyl acetate or polymers containing vinyl acetate, the co-monomers being selected from the group comprising vinyl esters of monocarboxylic acids containing from 3 to 18 carbon atoms, ethylene, propylene, butylene, and vinyl chloride. These products are commercially available in a variety of compositions. Accordingly, their molecular weight and their softening point may vary within wide limits. In general, the polymers used have a K-value of from about 50 to 80, particularly from about 50 to 75. It is extremely favorable in regard to processing for the particle size to be relatively small, for the most part, below 60μ.

Particularly favorable results are also obtained when vinyl acetate is co-polymerized with relatively large quantities of vinyl chloride. In this case, the percentage of vinyl acetate content may fall to from about 5 to 10% by weight. Favorable results are also obtained with vinyl acetate/ethylene co-polymers characterized by a ratio by weight of from about 80:20 to 40:60.

In principle, the plastisols according to the invention may be based on any so-called paste-forming polyvinyl chlorides known per se. As far as possible, they should have a K-value of from about 60 to 90 and a particle size below 150μ. In addition to PVC itself, it is possible to use other paste-forming, powder-form co-polymers of vinyl chloride which consist predominantly of vinyl chloride and of which the gelation properties at elevated temperature substantially correspond to those of pure homopolymeric vinyl chloride. Small quantities of vinylidene chloride or even methyl acrylate or methacrylate may be used for modification. As mentioned above, however, these co-monomers should only be present in very small quantities, i.e., in quantities of less than about 5 mol percent, since otherwise they could enter into an undesirable, permanent interaction with the polyvinyl acetate or co-polymers of polyvinyl acetate to be used.

Another suitable starting material for the process according to the invention is polymerized methyl methacrylate of the type obtainable in known manner by emulsion and dispersion polymerization. Polymers having a molecular weight in the range from about 200,000 to 1,500,000, as measured by light scattering, are generally used. Their molecular weight may be influenced in known manner by control of the polymerization reaction. It is also possible in some cases to use modified polymers of methyl methacrylate, alkyl esters of methacrylic acid derived from lower alcohols, such as ethyl, propyl, or butyl alcohol, or their isomers being particularly suitable for modification. However, the percentage contents of these co-polymerized esters should also not excess 5 mol percent.

It is, of course, also possible to use other co-monomers in the polymerization of the methyl methacrylate provided their percentage content remains below the above-mentioned limit, i.e., provided the end properties of the polymer do not differ significantly from those of the pure polymeric methyl methacrylate. Also, it is possible to use mixtures of PVC and polymethyl methacrylate or co-polymers essentially containing vinyl chloride and/or methyl methacrylate for the process according to the invention.

Suitable plasticizers include known plasticizers for PVC and polymers of methyl methacrylate, i.e., phthalic acid esters, such as dibutyl phthalate, dicyclohexyl phthalate, di-(methylcyclohexyl) phthalate, dioctyl phthalate, or didecylphthalate, or even sulfonic acid or alkyl-sulfonic acid esters of aromatic compounds such as, for example, the octadecylsulfonic acid ester of cresol or phenol. For practical reasons, $C_{14}$–$C_{16}$-alkyl-sulfonic acid esters of cresol or phenol are particularly suitable. It is also possible to use phosphoric acid esters, such as tricresyl phosphate, or even adipic acid or sebacic acid esters of medium-chain alcohols, such as butanol, octanol, or decanol. Finally, suitable plasticizers also include butyl benzoate, the dibenzoic acid ester of butane diol, diethylene glycol, or dipropylene glycol, or even rosin derivatives, such as, for example, its hydrogenated methyl ester.

The quantitative ratio of plasticizer to polymeric constituents may vary within wide limits and is governed by the properties of the plasticizers used and of the two polymeric constituents. In general, however, the plasticizer is used in a quantity of from about 20 to 400 parts by weight, preferably from about 20 to 300 parts by weight, based upon 100 parts by weight of polymeric components. A small content of plasticizers may be particularly desirable or necessary when, in addition to the usual so-called plasticizers, other similarly acting constituents, such as epoxy resins, for example, those based upon diphenylol propane, optionally in conjunction with cresyl glycidyl ether, and also epoxidized oils are used for producing the PVC-plastisols. These products act as auxiliary substances and favorably affect the properties of the hardened plastisols. They also have a favorable effect upon the toughness and resistance of the plastisols and upon their resistance to aging.

The new, relatively complex plastisols characterized by permanent adhesiveness in their pre-gelled state may contain, in known manner, fillers such as barium sulfate, calcium carbonate, powdered dolomite, or even pigments such as titanium dioxide or iron oxide. In many cases it is advisable to use calcium silicate or silica, particularly silica produced by pyrolysis. These materials have a favorable effect upon the rheological properties of the new systems.

It has also proven to be advantageous to introduce additives for improving the adhesion of the gelled or hardened polymers to a variety of substrates. Additives such as these are known and consist, for example, of methacrylic acid esters of polyhydric alcohols, such as ethylene glycol, trimethylol propane, pentaerythritol, or glycerol. However, peroxides capable of acting as initiators have to be added to activate the additives in question. Suitable peroxides include organic peroxides such as cumene hydroperoxide, tert.butyl-hydroperoxide, diisopropyl benzene hydroperoxide, tert.butylpermaleate, or cyclohexanone peroxide. However, it is also possible to use inorganic oxygen-releasing compounds such as barium peroxide, lead(IV) oxide, manganese(IV) oxide, or alkali metal peroxydisulfates. Other suitable adhesion promoters are phenolic and melamine resins and also polyamide resins containing free amino groups.

An addition of butane diol dimethacrylate and/or trimethyl propane dimethacrylate in conjunction with cumene hydroperoxide has proven to be a favorable combination.

The adhesive plastisols obtained by the process according to the invention adhere to a variety of different substrates, such as primed or lacquered surfaces which have not been freed from greasy constituents. They also adhere to electroplated surfaces and to completely untreated metals. This applies both to the pre-gelled state and also to the hardened state of the novel plastisol products.

It is particularly advantageous that the new adhesive plastisols may be hardened without any need for additional fixing. It is sufficient to apply them under pressure to a substrate, for example, to parts of a car body, before they actually gel or harden at elevated temperature, for example, at temperatures of from about 160° to 225° C. In this case, their adhesiveness is sufficient or may be regulated in such a way that they do not separate from the surface, even during the subsequent heating process. Dependent upon the individual constituents selected, it is possible to produce both (1) relatively stiff plastisols which no longer flow during the actual hardening process and also, in another way, (2) moldings of the type which still flow under the effect of gravity and thus penetrate into minor depressions and other surface irregularities.

The following examples are intended to illustrate the invention and should not be construed as limiting the invention thereto.

EXAMPLES

The components mentioned in the examples below were mixed in a forced-circulation mixer until a homogeneous paste was obtained. The components liquid at room temperature were introduced first, followed by gradual addition of the other components.

| Component | Amount (Kg) |
|---|---|
| Example 1 | |
| (a) Polyvinyl chloride (K — value = 90; particle size: 90% < 60μ) | 15.8 |
| (b) Vinyl chloride/vinyl acetate (90:10) co-polymer (K — value = 65; particle size: 90% < 60μ) | 3.8 |
| (c) Di-(methylcyclohexyl) phthalate | 49.0 |
| (d) Calcium oxide | 2.0 |

-continued

| Component | Amount (Kg) |
|---|---|
| (e) Barium sulfate | 23.2 |
| (f) Trimethylol propane trimethylacrylate | 5.0 |
| (g) Cumene hydroperoxide (80% in cumene) | 0.2 |
| (h) Tribasic lead sulfate | 1.0 |
| | 100.0 |
| Example 2 | |
| (a) Polyvinyl chloride (K—value = 74 particle size: 90% < 50μ) | 7.5 |
| (b) Vinyl chloride/vinyl acetate (90:10) co-polymer (K — value = 65; particle size; 90% < 60μ) | 7.5 |
| (c) Di-(methycyclohexyl) phthalate | 44.0 |
| (d) Barium sulfate | 40.0 |
| (e) Condensation product of dimerized fatty acids and polyamines (amine number = 290) | 1.0 |
| | 100.0 |
| Example 3 | |
| (a) Polymethyl methacrylate (glass transition temperature = −14° C.; particle size: 90% < 50μ) | 7.5 |
| (b) Vinyl acetate/ethylene (60:40) copolymer (particle size: 1–5μ) | 7.5 |
| (c) Di-(methylcyclohexyl) phthalate | 44.0 |
| (d) Barium sulfate | 40.0 |
| (e) Condensation product of dimerized fatty acids and polyamines (amine number = 250) | 1.0 |
| | 100.0 |
| Example 4 | |
| (a) Polymethyl methacrylate (glass transition temperature = −14° C.; particle size: 90% < 50μ) | 7.5 |
| (b) Vinyl acetate/ethylene (60:40) copolymer (particle size: 1–5μ) | 7.5 |
| (c) Di-(methylcyclohexyl) phthalate | 44.0 |
| (d) Barium sulfate | 35.8 |
| (e) Trimethylol propane trimethacrylate | 5.0 |
| (f) Cumene hydroperoxide (80% in cumene) | 0.2 |
| | 100.0 |

Sheets 2–3 mm in thickness were cast from the mixtures described above and gelled for ten minutes at 100° C. in a recirculating air cabinet. The sheets were cut up into approximately 2–3 mm wide strips of square cross-section. Of the pre-gelled, adhesive strips thus produced, those according to Examples 1 and 4 showed good adhesion to untreated steel still carrying residues of oil and to cleaned steel. The mixtures according to Examples 2 and 3 showed good adhesion to cleaned and primed (electroplated) steel.

The actual hardening of the pre-gelled plastisol strips was carried out over a period of 15 minutes at 160° C. The strips produced in accordance with Examples 1 and 4 showed hardly any flow during the actual hardening process whereas the strips produced in accordance with Examples 2 and 3 clearly flowed under the influence of gravity and, hence, even filled minor voids.

The tensile shear strength was measured (average of five measurements) on electroplated steel plates after gelation between plates at 170° C./15 mm in a layer thickness of 2 mm and with an overlength of 25×10 mm. The results were as follows:

| Example No. | Tensile Shear Strength (N/cm$^2$) |
|---|---|
| 1 | 160 |
| 2 | 170 |
| 3 | 80 |
| 4 | 100 |

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A process for preparing an adhesive, pre-gelled plastisol composition which consists essentially in the steps of:
   (a) mixing (1) copolymers of vinyl acetate with comonomers selected from the group consisting of ethylene in a vinyl acetate/ethylene ratio by weight of 80:20 to 40:60, and vinyl chloride in a percent by weight ratio of vinyl acetate to vinyl chloride of 5/95 to 10/90, with (2) conventional non-gelled plastisol mixtures based upon (i) polyvinyl chloride and/or polymethyl methacrylate and (ii) one or more suitable plasticizers in a ratio of about 10 to 200 parts of said copolymers of vinyl acetate to 100 parts by weight of polyvinyl chloride and/or polymethyl methacrylate and in a ratio of about 20 to 400 parts of said plasticizer to 100 parts by weight of said copolymers and said component (i), and
   (b) heating the mixture from step (a) to a temperature of from about 80° to 130° C., for a time sufficient to effect pre-gelation.

2. The process of claim 1, wherein the mixture from step (a) is heated to a temperature of from about 90° to 120° C.

3. The process of claim 1, wherein the suitable plasticizers are selected from the group consisting of conventional plasticizers for polyvinyl chloride and polymethyl methacrylate.

4. The process of claim 3, wherein the plasticizers are selected from the group consisting of phthalic acid esters, aromatic sulfonic acid esters, aromatic alkyl-sulfonic acid esters, phosphoric acid esters, butyl benzoate, the dibenzoic acid ester of butane diol, diethylene glycol, or dipropylene glycol, and rosin derivatives.

5. The process of claim 1, wherein said copolymers of vinyl acetate have a K-value of from about 50 to 80 and a particle size of, for the most part, below 60μ.

6. The process of claim 5, wherein said K-value is from about 50 to 75.

7. The process of claim 1, wherein said copolymers of vinyl acetate is said copolymer with ethylene.

8. The process of claim 1, wherein said copolymers of vinyl acetate is said copolymer with vinyl chloride.

9. The process of claim 7, wherein said non-gelled plastisol mixture is based on polymethyl methacrylate.

10. The process of claim 8, wherein said non-gelled plastisol mixture is based on polyvinyl chloride.

11. An adhesive, pre-gelled plastisol composition prepared according to the process of claim 1.

12. A process for joining, sealing, or stiffening automobile body components which comprises applying an effective amount of a composition of claim 11 to the area to be joined, sealed, or stiffened and then heating said area to an elevated temperature for a time sufficient to effect gelation.

* * * * *